(12) United States Patent
Woods et al.

(10) Patent No.: US 7,115,676 B2
(45) Date of Patent: Oct. 3, 2006

(54) ADHESIVE COMPOSITIONS FOR BONDING PASSIVE SUBSTRATES

(75) Inventors: John Woods, Farmington, CT (US); Susanne Morrill, West Hartford, CT (US); Rick Danheiser, Watertown, MA (US)

(73) Assignee: Henkel Corporation, Rocky Hill, CT (US)

( * ) Notice: Subject to any disclaimer, the term of this patent is extended or adjusted under 35 U.S.C. 154(b) by 361 days.

(21) Appl. No.: 10/258,862

(22) PCT Filed: May 18, 2001

(86) PCT No.: PCT/US01/16200

§ 371 (c)(1),
(2), (4) Date: Oct. 29, 2002

(87) PCT Pub. No.: WO01/88050

PCT Pub. Date: Nov. 22, 2001

(65) Prior Publication Data

US 2003/0217808 A1 Nov. 27, 2003

Related U.S. Application Data

(60) Provisional application No. 60/205,135, filed on May 18, 2000.

(51) Int. Cl.
*C09J 4/00* (2006.01)
*C08F 4/28* (2006.01)
*B05D 3/00* (2006.01)

(52) U.S. Cl. ............ 523/176; 520/193; 520/219; 520/227; 520/236; 427/327

(58) Field of Classification Search ............ 523/176; 526/193, 219, 227, 236; 427/327
See application file for complete search history.

(56) References Cited

U.S. PATENT DOCUMENTS

| | | | |
|---|---|---|---|
| 3,425,988 A | 2/1969 | Gorman et al. ............... 260/47 |
| 4,018,851 A | 4/1977 | Baccei ................... 260/859 R |
| 4,287,330 A | 9/1981 | Rich .......................... 526/270 |
| 4,295,909 A | 10/1981 | Baccei .................... 156/307.3 |
| 4,336,363 A * | 6/1982 | Crivello ...................... 526/333 |
| 4,968,383 A * | 11/1990 | Volkmann et al. ............ 216/65 |
| 5,411,998 A | 5/1995 | McArdle et al. ............ 523/176 |
| 5,550,201 A * | 8/1996 | Kneafsey et al. ........... 526/204 |

FOREIGN PATENT DOCUMENTS

EP 0 581 532 A 2/1994
JP 49 120889 11/1974

* cited by examiner

*Primary Examiner*—Tae H. Yoon
(74) *Attorney, Agent, or Firm*—Steven C. Bauman

(57) ABSTRACT

Adhesive compositions are disclosed which cure rapidly and completely on confinement between passive substrates, such as magnesium alloys, that are deficient in transition metals and transition metal ions. The compositions include one or more acrylate resins, one or more peroxy free radical initiators, one or more onium salts, and an accelerator such as acetylphenyl hydrazine desirably in an amount of about 1.0% or less by weight of the composition. These compositions provide exceptional bonding to such substrates without the need for a transition metal primer. Methods of making and using such compositions are also disclosed.

39 Claims, 5 Drawing Sheets

Dependence of lap-shear adhesive strength of room temperature curing time of Composition 5 with and without 0.25% ATPB; (magnesium substrates; "zero" gap)

Dependence of lap-shear adhesive strength on room temperature curing time of Composition 5 with and without 0.5% ATPB; (magnesium substrates; "zero" gap)

Dependence of lap-shear adhesive strength on Room Temperature curing time of Composition 5 with and without 0.5% ATPB on Magnesium substrates at 0.254 mm gap.

ADHESIVE COMPOSITIONS FOR BONDING PASSIVE SUBSTRATES

This application is a 371 of PCT/US01/16200 filed on May 18, 2001, which claims benefit of 60/205,135 filed on May, 18, 2000.

FIELD OF THE INVENTION

The present invention relates generally to compositions for bonding magnesium-based substrates. More particularly, the present invention relates to compositions which demonstrate excellent bonding capabilities to magnesium-based and other passive substrates without the need for the application of a primer prior to application of the composition on the substrate. These compositions are storage-stable and cure rapidly and thoroughly, particularly under anaerobic conditions.

BACKGROUND OF RELATED TECHNOLOGY

Anaerobic compositions are stable and remain in a liquid, unpolymerized state in the presence of oxygen, but cure to a polymerized, solid state in the absence of oxygen. Such compositions are generally characterized as being one-part systems, with the ability to cure at room temperature through a free radical reaction, and to cure through a reaction initiated on a substrate surface. The components of such compositions are often monomers, initiators, catalysts, stabilizers/inhibitors, and modifiers, which may be combined, typically by mixing, to provide formulations of various viscosities, colors, strengths, and adhesion properties.

As a result of their ability to cure in a substantially oxygen-free environment, anaerobic compositions have found great utility as adhesives, sealants, and bonding materials for use with closely mated surfaces, such as between interfitting metal parts. Known industrial uses include locking threaded fasteners, sealing threaded pipe connections, retaining cylindrical machine components, sealing flange joints, bonding structural components, and sealing porous metal castings. Anaerobic adhesives are typically packaged, sold and stored in containers which are permeable to oxygen, such as those made of polyethylene.

Cure of anaerobic compositions is usually accelerated by the presence of a suitable metal, such as a transition metal (e.g., iron, copper, and nickel), which renders such metals well-suited for bonding with such compositions. However, such metals are susceptible to corrosion, often times rendering them poorly suited for industrial applications where corrosion compromises the integrity of the parts.

In contrast, magnesium alloys, typically alloys which include magnesium, aluminum, zinc and manganese, are passive substrates which are characterized as having high resistance to corrosion and a high strength-to-weight ratio. Additionally, they are easily molded and have the ability to withstand high tolerances and high temperatures. As a result of these properties, magnesium alloys are finding utility in many commercial applications, such as automotive applications.

Magnesium alloys have traditionally been joined by riveting or welding. It is desirable, however, to bond magnesium alloys using adhesives, as this offers advantages in weight saving, fatigue strength, and corrosion resistance. Corrosion resistance is due in large part to the very low level or iron, copper, and nickel found in most common alloys. The lower quantity of these transition metals present in an alloy, the slower the rate of corrosion. However, the low level of these transition metals renders magnesium alloys particularly insensitive to anaerobic cure.

Iron and copper have been found to accelerate cure of anaerobic adhesives and typical anaerobic formulations generally require trace amounts of these elements to be present to effect cure. These elements are generally applied to the substrate surface as a primer prior to application of the anaerobic adhesive. Adhesive systems using such primers are known as two-part systems.

U.S. Pat. No. 5,411,998 to McArdle et al. discloses the use of anaerobic compositions in one and two part systems for sealing surfaces having thick bondlines. The one-part systems include as a cure system the combination of saccharin and an onium salt. Example 18 of McArdle also discloses a two-part system, with each part having a cure system, the first part including cumene hydroperoxide, saccharin and an onium salt, and a second part which includes saccharin and acetylphenyl hydrazine. Cure is achieved when the two parts are mixed together in equal amounts.

The additional step of treating the surface of the substrate with a primer is undesirable as compared with one-part systems not requiring a primer as the need for a primer renders the adhesive more expensive, more labor intensive to apply, and more difficult to package and distribute. Therefore, there exists a need for a method of bonding magnesium alloy substrates and related passive substrates using one-part anaerobic adhesive systems. The present invention provides a solution to meet this need.

SUMMARY OF THE INVENTION

The present invention is directed to compositions which are suitable for use as sealants, bonding agents, and threadlocking agents for magnesium-based and related passive substrates. More particularly, the present invention is directed to a one-part anaerobic adhesive for use in connection with bonding magnesium alloys and related passive substrates. The compositions contain one or more monomers, one or more peroxide initiators, one or more onium salts, and an organic hydrazine. Desirably the organic hydrazine is present in an amount of about 1.0% or less by weight of the composition. The compositions may optionally include saccharin, phenolic stabilizers, chelating agents, and various additives for modifying the uncured and cured bonding properties of the composition. The resulting activated adhesives cure rapidly and thoroughly on confinement between magnesium alloys and other passive substrates.

In one desired aspect of the present invention is provided an adhesive composition having improved bonding to passive substrates such as magnesium. The composition includes at least one monomer, at least one peroxy free radical initiator, at least one onium salt, and at least one organic hydrazine. Desirably, the organic hydrazine is present in an amount of up to about 1.5% by weight of the composition. The monomer may be anaerobically curable or may be curable by a moisture cure mechanism, heat cure mechanism, photo initiator mechanism, or a combination thereof. The monomer may be a (meth)acrylate monomer, such as a polyurethane(meth)acrylate monomer, the peroxy free radical initiator may be cumene hydroperoxide, and the onium salt may be a phosphonium salt, an ammonium salts or a combination thereof. The phosphonium salt may be present in an amount from about 0.25 to about 2.0% by weight of the composition. The composition may additionally include saccharin, dimethyl p-toluidine, phenolic stabilizers, chelating agents, and combinations thereof.

In a method aspect of the present invention is provided a method for providing enhanced bonding to passive substrates such as magnesium which includes the steps of: (a) providing a composition which includes at least one monomer, at least one peroxy free radical initiator, at least one onium salt, and at least one organic hydrazine; (b) disposing the composition between two substrates; and (c) effecting cure of the composition to effectuate enhanced bonding thereof.

In another method aspect of the present invention is provided a method of making an anaerobic adhesive composition having improved bonding to passive substrates such as magnesium which includes the steps of: (a) providing at least one monomer, at least one peroxy free radical initiator, at least one onium salt; and at least one organic hydrazine; and (b) combining each of the components to form a mixture.

DETAILED DESCRIPTION OF THE INVENTION

Figure 1:
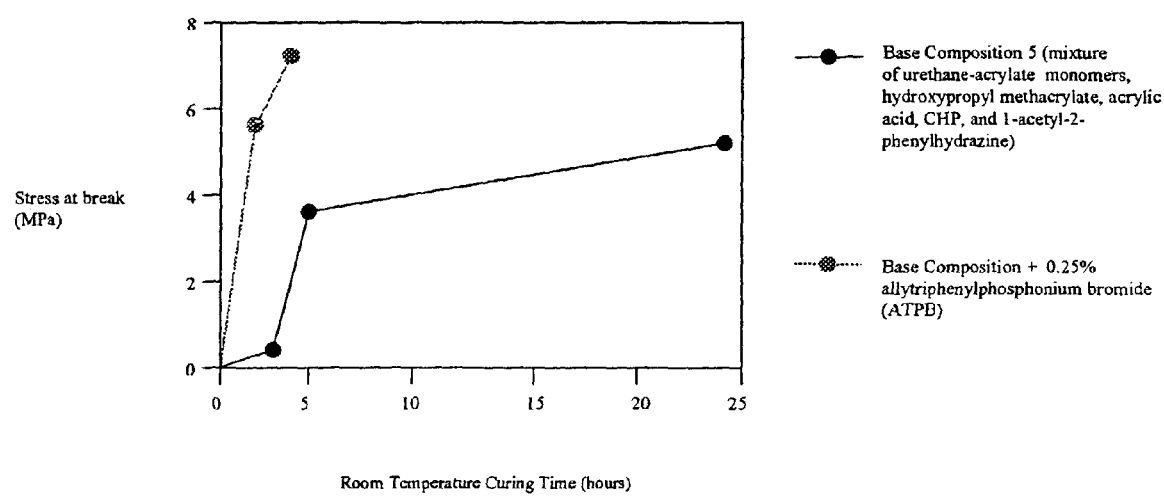
FIGS. 1, 2 and 3 are graphs showing lap-shear test results on magnesium substrates at zero gap and 0.254 mm gap for anaerobic compositions with and without the addition of various concentrations of a phosphonium salt.

The present invention relates to adhesive compositions which are capable of sealing, bonding, and threadlocking magnesium-based and related passive substrates. Desirably, the present invention relates to one-part anaerobic adhesives. Known anaerobic adhesives used to seal and bond passive substrates require the use of a primer containing a transition metal that serves to catalyze polymerization of the monomer which is present. Thus, conventional anaerobic compositions for passive substrates are two-part bonding systems. Additionally, known anaerobic compositions, such as those disclosed in the '998 patent, require the use of peroxide and saccharin in combination with an onium salt in order to effect desired curing. The '998 patent also discloses a two part adhesive system where the first part includes saccharin, peroxide and an onium salt as the cure system, and the second part includes saccharin and acetylphenyl hydrazine as a second cure system. By contrast, it has been found that the present invention permits rapid and full cure of one-part anaerobic compositions on passive substrates without the need for a primer, without the need for saccharin, and by inclusion of a hydrazine compound. Accordingly, the present invention provides an economical and efficient adhesive compound for bonding magnesium-based and related passive substrates.

The one-part anaerobic compositions of the present invention exhibit accelerated cure and improved bonding as a result of the addition of onium salts, particularly phosphonium salts, and an organic hydrazine which is present in an amount of less than 1.0% by weight of the composition. For example, these compositions desirably contain mixtures of methacrylate ester resins, monomers and crosslinkers (desirably 50–98% by weight), peroxides or hydroperoxides (desirably 0.1–10%), one or more onium salts, and an organic hydrazine such as acetyl phenylhydrazine (APH), which is desirably present in an amount of about 1.0% or less by weight of the composition. The compositions may optionally contain other components including saccharin, dimethyl p-toluidine (DMPT), phenolic stabilizers, chelating agents, and various additives for modifying properties of the uncured and cured compositions.

Compositions of the present invention cure rapidly and completely on confinement between magnesium alloys and related passive substrates that are deficient in transition metals and transition metal ions such as iron, copper, and nickel. In contrast, conventional anaerobic adhesives exhibit slow and incomplete curing on such substrates. The adhesives of the present invention are desirably stable one-part products under ambient storage conditions, but polymerize rapidly in contact with magnesium and magnesium alloys. Alternatively, the adhesives of the present invention may be used in conjunction with a primer. Surface primers are not required to induce curing, but may be used to further enhance curing rates or to promote even further adhesion to the substrates.

The adhesives of the present invention are tolerant of a wide variety of traditional anaerobic adhesive curing agents and additives including ortho-Benzoic Sulfimide, DMPT, chelators and stabilizers, which permit existing products to be easily modified for use on magnesium surfaces. In addition, such additives may enhance the reactivity and other properties of the adhesives.

Any suitable monomer may be used in the adhesives of the present invention. Desirably, the monomers used in the present invention are (meth)acrylate monomers. Such monomers are desirably characterized as being either flexible or rigid. It will be apparent to one of ordinary skill in the art that the choice of monomers is dependent on the desired properties of the resultant curable product. Within the (meth) acrylate component are a wide variety of mono(meth)acrylate materials represented by $H_2C=CGCO_2R^{15}$, where G may be hydrogen, halogen or alkyl of 1 to about 4 carbon atoms, and $R^{15}$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with such substituents as silane, silicon, oxygen, halogen, carbonyl, hydroxyl, ester, carboxylic acid, urea, urethane, carbamate, amine, amide, sulfur, sulfonate, sulfone and combinations thereof.

Additional anaerobic curing monomers useful in the present invention include the alkylene glycol diacrylates having the general formula:

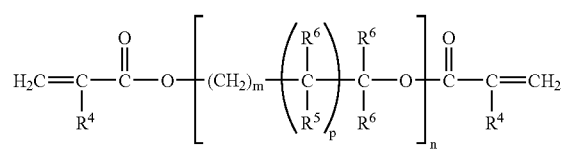

where $R^6$ represents a radical selected from the group consisting of hydrogen, lower alkyl of 1–4 carbon atoms, inclusive, hydroxyalkyl of 1–4 carbon atoms inclusive, and

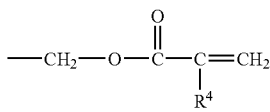

wherein $R^4$ is a radical selected from the group consisting of hydrogen, halogen, and lower alkyl of 1–4 carbon atoms; $R^5$ is a radical selected from the group consisting of hydrogen, —OH and

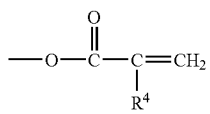

m is an integer equal to at least 1, desirably 1–8 and more desirably from 1 to 4; n is an integer equal to at least 1, desirably 1 to 20; and p is 0 or 1.

Typical of these monomers are mono-, di-, tri- tetra- and polyethylene glycol dimethacrylate and the corresponding diacrylates; di(pentamethylene glycol)dimethacrylate; tetra-ethylene glycol di(chloroacrylate); diglycerol diacrylate; diglycerol tetramethacrylate; butylene glycol dimethacrylate; neopentyl glycol diacrylate; and trimethylopropane triacrylate.

Useful polymerizable crosslinkable components are ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth) acrylate, neopentylglycol propoxylate di(meth)acrylate, 1,4-butanediol di(meth)acrylate, polyethyleneglycol di(meth) acrylate, triethyleneglycol di(meth)acrylate, butylene glycol di(meth)acrylate, ethoxylated bisphenol A di(meth)acrylate and combinations thereof.

Other useful monomers include those acrylates derived from bisphenol-A, such as bisphenol-A dimethacrylate, hydrogenated bisphenol-A dimethacrylate, and ethoxylated bisphenol-A di(meth)acrylate.

While di- and other polyacrylate esters have been found particularly desirable, monofunctional acrylate esters (esters containing one acrylate group), which may conform to the aforementioned monofunctional (meth)acrylate structure also may be used. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. The materials are often incorporated as reactive diluents which are capable of copolymerizing with the various other polymerizable materials.

More specific (meth)acrylate monomers particularly desirable for use herein include polyethylene glycol di(meth)acrylates, desirably triethyleneglycol di(meth)acrylate, hydroxypropyl(meth)acrylate, bisphenol-A di(meth) acrylates, such as ethoxylated bisphenol-A(meth)acrylate ("EBIPA" OR "EBIPMA"), and tetrahydrofuran(meth)acrylates and di(meth)acrylates, citronellyl acrylate and citronellyl methacrylate, hexanediol di(meth)acrylate ("HDDA" or "HDDMA"), trimethylol propane tri(meth)acrylate, tetrahydrodicyclopentadienyl (meth)acrylate, ethoxylated trimethylol propane triacrylate ("ETTA"), triethylene glycol diacrylate and triethylene glycol dimethacrylate ("TRIEGMA").

For purposes of illustration only, listed herein are examples of urethane-acrylate monomers suitable for use in the present invention. However, it is to be understood that any acrylate resin, including non-urethane acrylates and methacrylates may be used in the present invention. Desirably, monomers used is the present invention are polyurethane polyacrylate monomers. Examples of such monomers are described in U.S. Pat. No. 3,425,988 to Gorman et al., specifically incorporated by reference herein. These monomers may be represented by the following general formula:

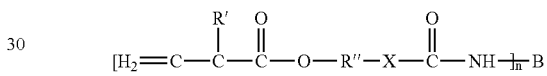

wherein B is a polyvalent organic radical selected from the group consisting of alkyl, alkenyl, cycloalkyl, aryl, aralkyl, alkaryl and heterocyclic radicals both substituted and unsubstituted; X is selected from the group consisting of —O— and

radicals; n is an integer from 2 to 6 inclusive; R' is a member selected from the class consisting of hydrogen, chlorine and methyl and ethyl radicals; and R" is a divalent organic radical selected from the group consisting of lower alkylene of 1 to 8 carbon atoms, phenylene and naphthalene radicals.

Additional urethane-acrylate-capped poly(alkylene)ether polyol monomers, such as those described in U.S. Pat. No. 4,018,851 to Baccei, specifically incorporated by reference herein, may be used in the present invention. Such monomers may be represented by the following formula:

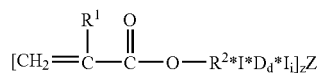

where $R^1$ is selected from the group consisting of hydrogen, chlorine and methyl and ethyl radicals; $R^2$ is a divalent organic radical selected from the group consisting of lower alkylene of 1–8 carbon atoms, phenylene and naphthalene; I is a polyisocyanate radical; D is an aromatic, heterocyclic or cycloaliphatic polyol or polyamine radical, desirably a diol, and more desirably a diol of a cycloaliphatic compound; Z is a polymeric or copolymeric grafted alkylene ether polyol or alkylene ether polyol radical; z is an integer corresponding to the valency of Z; d is either 1 or 0; and i is 0 when d is 0, and otherwise equal to one less than the number of reactive hydrogen atoms of D. As used herein, an asterisk (*) indicates a urethane (—N—H—COO—) or ureide (—NH—CO—NH—) bond.

Further, urethane-acrylate-capped polybutadiene-based monomers, such as those described in U.S. Pat. No. 4,295,909, to Baccei, specifically incorporated by reference herein, may be used in the present invention. Such polymers may be represented generally by the following formula:

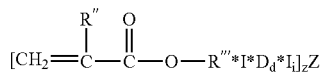

where R" is selected from the group consisting of hydrogen, chlorine and methyl and ethyl radicals; R''' is a divalent organic radical selected from the group consisting of lower alkylene of 1–8 carbon atoms, phenylene and naphthalene; I is a polyisocyanate radical; D is an aromatic, heterocyclic or cycloaliphatic polyol or polyamine radical, desirably a diol of a cycloaliphatic compound; Z is a polymeric or copolymeric polyol or poly radical of butadiene, the latter having a degree of polymerization of from about 5 to 150 and at least about 70 percent of the polybutadiene portion of the 1,4-configuration; z is an integer corresponding to the valency of Z; d is either 1 or 0; and i is 0 when d is 0, and otherwise is equal to one less than the number of reactive hydrogen atoms of D. As used herein, an asterisk (*) indicates a urethane (—N—H—COO) or ureide (—NH—CO—NH—) bond.

While the present invention is particularly well suited to anaerobic compositions, it is in no way limited to compositions which cure under anaerobic conditions, nor is it limited to the use of (meth)acrylate-based monomers. For example, additional monomers which are known to cure through free radical polymerization reactions could be used in the present invention. Examples of such monomers include, but are not limited to, styrene, thiol-enes, acrylamides, maleate esters, fumarates, methylene maleates, and epoxides. Further, the addition of various functional groups to (meth)acrylate monomers which may be used in the present invention will permit the inventive compositions to cure in a variety of ways, such as by moisture, room temperature, heat and light. For instance, the addition of a photoinitiator to compositions of the present invention will permit dual curing (under anaerobic conditions and by light) of the compositions.

The present invention also includes a suitable initiator which will effect polymerization of the monomer. Desirably, such initiators are peroxy free radical initiators, such as those described in U.S. Pat. No. 4,287,330 to Rich, specifically incorporated herein by reference. Desirably, the peroxy free radical initiator used in the present invention is an organic hydroperoxide such as cumene hydroperoxide (CHP), methylethyl ketone hydroperoxide, or t-butyl hydroperoxide. Additional hydroperoxides may also be used, such as p-menthane hydroperoxide, diisopropylbenzene hydroperoxide, and pinene hydroperoxide. The initiator is desirably present in an amount sufficient to initiate polymerization of the monomer. The initiators set forth above are forth for the purposes of illustration only and are in no way meant to limit the initiators that may be used in the present invention.

The present invention also includes one or more accelerators which catalyze cure of the polymer composition, such as those described in the '330 patent. The present invention includes an organic hydrazine. Desirably the organic hydrazine is present in an amount of about 1.0% w/w or less. The organic hydrazine may be represented generally by the following formula:

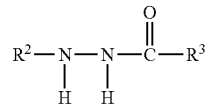

where $R^2$ may be selected from the following radicals: alkyl, preferably lower alkyl containing 1–6 carbon atoms, either straight chain or branched, more preferably methyl, ethyl or isopropyl; cycloalkyl containing up to about 8 carbon atoms; alkenyl containing up to about 10, preferably 2–5 carbon atoms, cycloalkenyl containing up to 10, preferably up to about 6, carbon atoms; aryl, including haloalkoxy groups containing one to about 6 carbon atoms. $R^3$ may be hydrogen or any one of the radicals specified for $R^2$ and in addition may be an amino or substituted amino group, or a carbonyl group to which is connected an unreactive group such as a lower alkyl containing from one to about 4 carbon atoms. $R^3$ may also be either of the following groups:

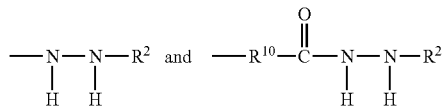

where $R^{10}$ is selected from the group consisting of alkyl groups containing one to about 10 carbon atoms, alkenyl groups containing two to about ten carbon atoms, and aryl groups containing up to about 10 carbon atoms. The accelerator(s) should be present in an amount sufficient to accelerate the polymerization at room temperature.

The organic hydrazine used in the present invention is desirably an acetylphenyl hydrazine (APH). Representative compounds according to the above general formula which are useful in the present invention include, but are not limited to, 1-acetyl-2-phenyl hydrazine, 1-acetyl-2(p-tolyl) hydrazine, 1-benzoyl-2-phenyl hydrazine, 1-(1',1',1'-trifluoro)acetyl-2-phenyl hydrazine, 1,5-diphenylcarbohydrazide, 1-formyl-2-phenyl hydrazine, 1-acetyl-2-(p-bromophenyl)hydrazine, 1-acetyl-2-(p-nitrophenyl)hydrazine, 1-acetyl-2-(p-methoxyphenyl)hydrazine, 1-acetyl-2-(2'-phenylethyl)hydrazine, 1-acetyl-2-methyl hydrazine, 1-phenylsemicarbazide, 2-phenyl-t-butylcarbazate, and succinic acid di(phenylhydrazide).

Other accelerators which may be used in the present invention include, but are not limited to, tertiary alkyl amines, rhodamine, alkoxy amines, and ferrocene compounds.

The present invention also includes an onium compound. It is believed that this onium compound serves as a reducing agent. Examples of suitable onium compounds include, but are not limited to, phosphonium and ammonium compounds, such as those described in the '998 patent, incorporated herein by reference.

Ammonium salts useful in the present invention may be represented by the following formula:

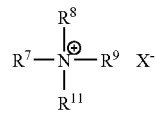

wherein $R^7$, $R^8$, $R^9$ and $R^{11}$, which may be the same or different, are hydrocarbyl, hydrocarbylaryl, aryl or a substituted derivative thereof, X is Cl, Br or F or a soft anion, such as —$SbF_6$, —$BF_4$ or $PF_6$.

Desirably, the onium salt is a phosphonium salt, which may be represented by the following formula:

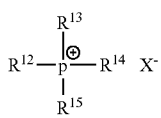

wherein $R^{12}$, $R^{13}$, $R^{14}$ and $R^{15}$ which may be the same or different, are hydrocarbyl, hydrocarbylaryl, aryl or a substituted derivative thereof; X is Cl, Br, I or F or a soft anion, such as —$SbF_6$, —$BF_4$ or $PF_6$. Desirably, $R^{12}$, $R^{13}$ and $R^{14}$ are each phenyl or $C_1$–$C_5$ alkyl.

Desirably, the phosphonium salt used in the present invention is selected from allyltriphenylphosphonium bromide (ATPB), 2-(ethoxycarbonyl)ethyl-triphenylphosphonium bromide, 1-ethoxycarbonylethyl triphenylphosphonium bromide, 4-ethoxycarbonylbutyl triphenylphosphonium bromide, carbethoxymethyl triphenylphosphonium bromide, or methyltriphenylphosphonium bromide.

In one aspect of the present invention, mixtures of onium salts may be used, such as mixtures comprising combinations of different phosphonium salts, combinations of different ammonium salts and combinations of phosphonium and ammonium salts.

The present invention may optionally include additional ingredients, including but not limited to saccharin, dimethyl p-toluidine (DMPT), phenolic stabilizers, and chelating agents, may serve to modify the uncured and cured adhesive properties of the composition.

It has also been discovered, however, that the present inventive compositions can achieve their enhanced cure speed and completeness of cure in the absence of commonly incorporated accelerators such as sulfimides, e.g. saccharin.

Having set forth examples of suitable compounds which may be present in compositions of the present invention, specific examples of compositions which were formulated and tested will now be set forth in detail below.

TABLE I

Screening Agents
Nine quaternary phosphonium and ammonium salts were used in determining their importance in promoting cure of anaerobic adhesives in contact with magnesium oxide. Salt 1 was synthesized as indicated below. Salts 2–9 were obtained from commercial sources.
The structures of these compounds are as follows:

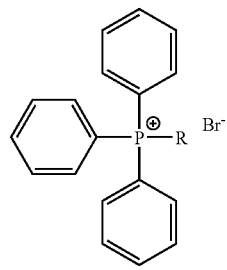

| Onium Salt | R |
|---|---|
| 1 | —$CH_2CH_2COOEt$ |
| 2 | —$CH_3$ |
| 3 | —$CH_2CH=CH_2$ |
| 4 | —$CH(CH_3)COOEt$ |
| 5 | —$(CH_2)_4COOEt$ |

TABLE I-continued

Screening Agents
Nine quaternary phosphonium and ammonium salts were used in determining their importance in promoting cure of anaerobic adhesives in contact with magnesium oxide. Salt 1 was synthesized as indicated below. Salts 2–9 were obtained from commercial sources.
The structures of these compounds are as follows:

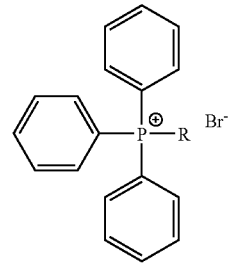

| Onium Salt | R |
|---|---|
| 6 | —$CH_2COOEt$ |
| 7 | $Bu-P^{\oplus}(Bu)(Bu)-Bu$  $Br^-$ |
| 8 | $Bu-N^{\oplus}(Bu)(Bu)-Bu$  $Br^-$ |
| 9 | $C_8H_{17}-N^{\oplus}(C_8H_{17})(C_8H_{17})-CH_3$  $Cl^-$ |

Synthesis of 2-(ethoxycarbonyl)ethyl triphenylphosphonium bromide (Salt 1)

Ethyl 3-bromopropionate (1.81 g, 0.01 moles) was added to a three-necked, 100 mL round bottom flask equipped with a magnetic stirrer, thermocouple and temperature controller, condenser, and heating mantle. Triphenylphosphine (2.62 g, 0.01 moles) and toluene (25 ml) was added and the mixture was heated to reflux temperature. As the temperature turned 90° C., the mixture turned slightly cloudy. After 3 hours at 115° C., the reaction mixture was cooled to room temperature, during which time a yellow colored waxy material settled to the bottom of the reaction flask. The liquid was removed and the residual waxy solid dissolved in dichloromethane (about 10 ml). Diethyl ether (about 15 ml) was added to the dichloromethane solution and a precipitate was formed. The precipitate was collected by filtration and dried under vacuum to give the required phosphonium salt (0.8 grams; 18% yield). The structure of the product was confirmed by $^1$H NMR analysis.

EXAMPLE 1

Comparison of Anaerobic Adhesives with and Without Organic Hydrazine

Anaerobic adhesive Composition A was prepared from a mixture of 93.00% w/w methacrylate ester monomers (78.00% urethane-methacrylate-acrylate monomers; 15.00% hydroxypropyl methacrylate), 6.00% acrylic acid, and 1.00% CHP. Five compositions were subsequently prepared from Composition A as indicated below:

TABLE 2

| Composition | Additive to Composition A | % Additive (% w/w) | Polymer | Adhesion |
|---|---|---|---|---|
| 1 | None | — | soft + tacky | poor |
| 2 | Onium Salt 1 | 1.0 | hard + dry | poor |
| 3 | Onium Salt 3 | 1.0 | hard + dry | poor |
| 4 | Onium Salt 9 | 1.0 | hard + dry | poor |
| 5 | 1-acetyl-2-phenylhydrazine | 0.95 | hard + dry | good |

Cast magnesium lap-shear joints were assembled with Compositions 1–5. The bondline gap was set at 0.254 mm (10 mil) and the joints were allowed to cure at room temperature for 24 hours. After curing, a qualitative assessment of the degree of polymerization and adhesive strength was made. All but Composition 5 showing poor adhesion.

Composition 1, without added onium salt, served as a control to determine the importance of the onium salt alone, and Composition 5, which did not include an onium salt but did include an organic hydrazine, served as a control to determine the importance of the organic hydrazine alone.

As seen in Table 2, all of the adhesive joints assembled using Compositions 1–4 showed poor adhesion by comparison to Composition 5. However, Compositions 2–4, which contained onium salts, were found to have cured to a desirable hard and dry polymer film, whereas Composition 1, without onium salt, was soft and tacky. This indicates that the inclusion of onium salts and organic hydrazines to anaerobic adhesives are important in the development of cured polymer and adhesive strength on magnesium surfaces. The use of onium salts promote cure of the polymer, while the use of hydrazines promotes cure of the polymer as well as adhesive strength.

EXAMPLE 2

To determine which onium salts are most effective at promoting adhesive strength of anaerobic adhesives on magnesium surfaces, anaerobic adhesive Composition B was formulated to which onium salts 1–9 (Table I) were added. Composition B comprised a mixture of triethyleneglycol dimethacrylate (TRIEGMA) 87.5% w/w, hydroxypropyl methacrylate (HPMA) 10.0% w/w, CHP 1.5% w/w, and 1.0% w/w of the onium salt being tested. Additionally, one mixture was formulated as a control in which no onium salt was present.

One gram of each of the ten compositions was placed in each of two glass vials. To one vial was added 0.01 grams of magnesium shavings, which were used as a model for the alloy substrates. The vials were left at room temperature for 24 hours and then examined for gellation. The results are presented in Table 3.

TABLE 3

Results of the room temperature gel-test experiments in model anaerobic adhesives with and without magnesium turnings

| Salt # Present In Composition B | Type of Salt | 24 hour gel With Mg | 24 hour gel Without Mg |
|---|---|---|---|
| none (control) | — | no | no |
| 1 | $P^{\oplus}$ | yes | no |
| 2 | $P^{\oplus}$ | yes | no |
| 3 | $P^{\oplus}$ | yes | no |
| 4 | $P^{\oplus}$ | no | no |
| 5 | $P^{\oplus}$ | no | no |
| 6 | $P^{\oplus}$ | no | no |
| 7 | $P^{\oplus}$ | no | no |
| 8 | $N^{\oplus}$ | no | no |
| 9 | $N^{\oplus}$ | yes | yes |

Compositions which gelled in the presence of magnesium turnings are sensitive to magnesium as they are activated with regard to curing in the presence of magnesium. For the purposes of the present invention, it is desired that such compositions do not gel in the absence of magnesium, in order to maintain their stability. As such, compositions containing phosphonium salts 1–3, which were found to have gelled in the presence of magnesium but not in the absence of magnesium, are ideally suited for use in the present invention. The differential reactivity of these compositions may be used to screen potentially useful compounds or activators for use in anaerobic adhesives for bonding magnesium alloys.

It has been further determined that it is important to have present, in addition to the onium salts, an organic hydrazine in order to achieve the cure speed, cure completeness and ultimate desired cure strength on passive substrates such as magnesium alloys. For example, compositions containing phosphonium salts 4–7 and the composition containing quaternary ammonium salt 8, all of which did not include the organic hydrazine, showed no reactivity towards magnesium. The composition containing quaternary ammonium salt 9, which also did not include an organic hydrazine, resulted in the gellation of the adhesive composition in both the presence and absence of magnesium. Although this composition cures in the presence of magnesium, it shows no differential reactivity or selectivity in the absence of magnesium, as the compositions containing phosphonium salts 4–7 do. It should be noted that in a screening test such as this, gellation is not necessarily an accurate measure of the ability to obtain sufficient cure to achieve the desired adhesive. However, such screening is indicative of whether there is reactivity of the composition in the presence of the passive substrate.

These tests were repeated for compositions including onium salts 1–3 but without added CHP in the formulation. All three compositions failed to gel within a 24 hour period, indicating that both hydroperoxide and phosphonium salt are required to provide magnesium-sensitive compositions. Taken together with Example 1, these experiments indicate that a formulation including hydroperoxide, phosphonium salt, and an organic hydrazine in combination with one or more monomers would be well suited for use as an adhesive and bonding material for magnesium and related passive substrates. As such, further experimentation was conducted using such inventive formulations, as indicated below.

EXAMPLE 3

Composition 5 (mixture of urethane-acrylate monomers, hydroxypropyl methacrylate, acrylic acid, CHP, and 1-acetyl-2-phenylhydrazine) was used as a base formulation for measuring the effect of allyltriphenylphosphonium bromide (ATPB) (Salt 3 in Table I) as a curing activator on magnesium alloy substrates. Adhesive formulations containing 0.25, 0.5, 1.0, and 2.0% w/w ATPB dissolved in Composition 5 were prepared in low density polyethylene bottles by adding approximately half the required amount of Composition 5 to the bottle followed by the phosphonium salt and the remainder of Composition 5.

less than two hours, whereas the unmodified control Composition 5 has not reached this value even after 24 hours.

EXAMPLE 4

Figure 3:
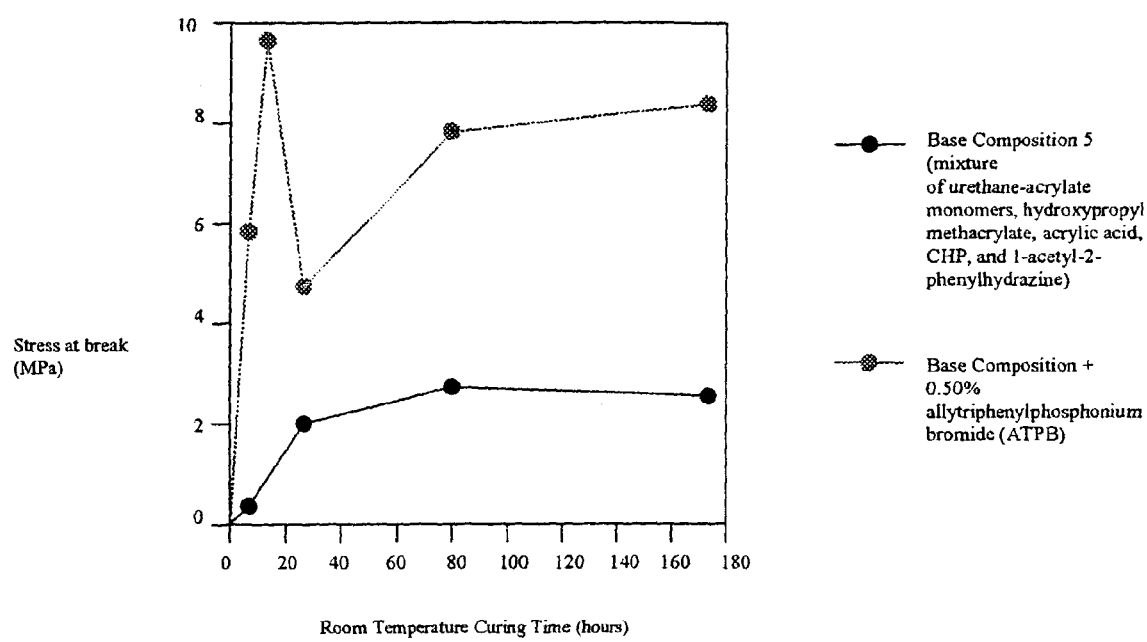

ATPB was also found to accelerate the curing of Composition 5 (Control) at the relatively large bondline gap of 0.254 mm (10 mil), as shown in Table 5 and FIG. 3.

TABLE 5

Lap-shear test results of onium salt-modified anaerobic adhesive on magnesium alloy substrates at 0.254 mm (10 mil) gap (average 5 specimens)

| Curing Time (hours) | Composition 5 (MPa) | Composition 5 + 0.25% ATPB (MPa) | Composition 5 + 0.5% ATPB (MPa) | Composition 5 + 1.0% ATPB (MPa) | Composition 5 + 2.0% ATPB (MPa) |
|---|---|---|---|---|---|
| 2 | 0.1 ± 0.1 | | | 5.4 ± 2.0 | |
| 4 | | | 6.1 ± 2.1 | 8.0 ± 2.7 | |
| 8 | 0.6 ± 0.4 | | 9.1 ± 3.7 | 3.0 ± 0.7 | 4.9 ± 1.3 |
| 24 | 1.4 ± 0.4 | 7.0 ± 1.4 | 5.0 ± 1.2 | | |
| 72 | 2.5 ± 0.3 | | 7.2 ± 0.9 | 4.0 ± 1.0 | |
| 168 | 2.9 ± 0.4 | | 8.1 ± 2.9 | | |

The mixture was stirred mechanically for about thirty minutes and allowed to sit overnight at room temperature to ensure complete removal of air bubbles. Stability was performed at 82° C. in 10×75 mm glass vials in a temperature controlled heating block fitted with a calibrated thermocouple. The magnesium alloy lap-shear specimens were wiped with acetone and allowed to dry before use.

Lap-shear testing was performed on an Instron tension tester, fitted with a 1 or 5 KN load cell, at a strain of 12.7 mm/min, according to American Standard Test Method (ASTM) D-1002. The tests were performed at "zero" and 0.254 mm (10 mils) gaps. A short steel U-shaped wire spacer was used to set the gap. An average of 5 measurements was made for each test. The adhesive strength was determined as a function of the curing times under ambient conditions. For comparative purposes, Composition 5 was evaluated as a control formulation. The results obtained at "zero" gap are presented in Table 4 and FIGS. 1 and 2 below and the results obtained at 0.254 mm gap are presented in Table 5 and FIG. 3 below.

TABLE 4

Lap-shear test results of onium salt-modified anaerobic adhesive on magnesium alloy substrates at "zero" gap (average 5 specimens)

| Curing Time (hours) | Composition 5 (MPa) | Composition 5 + 0.25% ATPB (MPa) | Composition 5 + 0.5% ATPB (MPa) |
|---|---|---|---|
| 2 | 0.7 ± 0.3 | 5.8 ± 1.0 | 6.8 ± 1.7 |
| 4 | 3.4 ± 1.9 | 6.9 ± 2.0 | 7.4 ± 3.3 |
| 24 | 5.2 ± 0.9 | — | 6.7 ± 2.7 |

Figure 2:
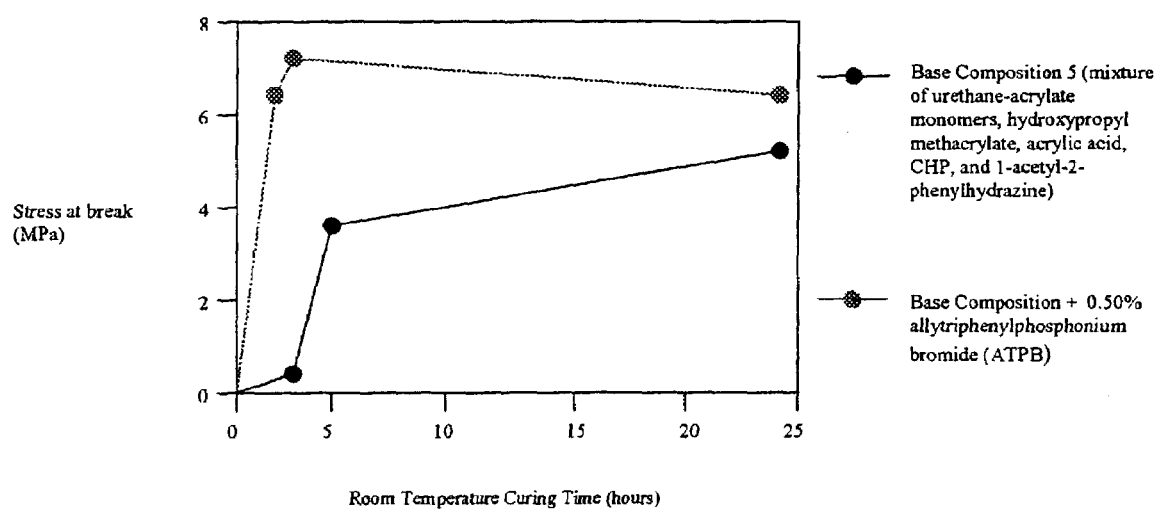

FIGS. 1 and 2 illustrate diagrammatically the results shown in Table 4. As seen in FIG. 1, at "zero" gap, the composition containing 0.25% ATPB shows an eight-fold increase of curing rate compared to the control Composition 5. Additionally, the ultimate strength obtained is enhanced by the presence of the phosphonium salt. As seen in FIG. 2, similar results were obtained for the composition containing 0.5% ATPB. In this case, the curing rate of the onium modified composition is ten times that of the control Composition 5 without added salt. In this figure, it is clear that the ultimate strength of the modified composition is obtained in As seen in Table 5, at a level of approximately 1.0% w/w ATPB, the cure speed is enhanced by a factor of approximately 50 and the ultimate strength is achieved within the first four hours of curing. In contrast, the unmodified adhesive Composition 5 cures only very sluggishly and never reaches more than ⅓ the ultimate strength. As seen in FIG. 3, at a level of approximately 0.5% w/w ATPB, ultimate cure was achieved within the first eight hours of curing and was enhanced by a factor of approximately 15. These results clearly demonstrate the ability of the present inventive compositions to cure through large gaps.

EXAMPLE 5

Desirably, base Composition 5 is stable for at least two hours at 82° C. The addition of one percent of the phosphonium salt ATPB was observed to decrease the stability of Composition 5 at this temperature. However, reducing the amount of salt resulted in a product which exhibited stability similar to that of Composition 5 alone while maintaining the desirable adhesive characteristics of the modified Composition 5. Stability tests were conducted on base Composition 5 mixed with various amounts of ATPB and maintained at 82° C., as shown in Table 6. All of the formulations showed good stability on ambient storage over a six-week period.

TABLE 6

82° C. Stability of Composition 5 with added ATPB

| Amount of added ATPB (% w/w) | Gel Time (hours) |
|---|---|
| None | >2 |
| 1 | 0.5–0.75 |
| 0.5 | 1.0–1.25 |
| 0.25 | >2 |

EXAMPLE 6

Anaerobic adhesive Compositions 6–8 were prepared by blending together the ingredients listed in Table 7. The resin mixtures comprised a blend of urethane acrylate prepolymers, monomers, and polymerization stabilizers typically used in the formulation of anaerobic adhesives.

TABLE 7

Formulations of anaerobic adhesive compositions 6–8. All amounts are expressed in % by weight

| Component | Composition 6 | Composition 7 | Composition 8 |
|---|---|---|---|
| Resin Mixture | 97.25 | 97.75 | 97.75 |
| CHP | 1.00 | 1.00 | 1.00 |
| ATPB | 0.75 | 0.75 | 0.75 |
| APH | 1.00 | 0.50 | |
| Saccharin | | | 0.50 |

The liquid compositions were used to assemble magnesium alloy lap-shear specimens having an induced gap of 0.254 mm (10 mil). The assembled specimens were allowed to cure at room temperature for 5.5 hours and tested according to the ASTM procedure set forth above. The results are presented in Table 8.

TABLE 8

Lap-shear adhesive strength test results for adhesive compositions 6–8 on magnesium substrates. Values are the average of 5 measurements.

| Adhesive | Stress at break (MPa) | Mode of Failure |
|---|---|---|
| 6 | 5.7 | adhesive |
| 7 | 5.3 | adhesive |
| 8 | 1.1 | cohesive |

As seen in Table 8, the inventive compositions containing APH have significantly enhanced performance on magnesium compared with the same composition containing saccharin. On average, the APH containing formulations (Compositions 6 and 7) exhibit five times the adhesive strength of the comparable material containing saccharin (Composition 8). The results also demonstrate that concentrations of APH lower than 1% are effective in activating the onium salt containing anaerobic adhesives on magnesium substrates as no significant different in the adhesive strengths of Compositions 6 and 7 are seen, yet Composition 7 contains only half the amount of APH that is present in Composition 6.

An examination of the substrates following the adhesive tests showed that Compositions 6 and 7 were hard and well cured, whereas Composition 8 was soft, tacky, and only partially cured. These differences in the degree of curing are reflected in the observed modes of failure.

EXAMPLE 7

To further study the effects of APH in the present invention, anaerobic adhesive Compositions 9 and 10 were prepared by blending together the ingredients listed in Table 9.

TABLE 9

Formulations of anaerobic adhesive compositions 9 and 10. All amounts are expressed in % by weight.

| Component | Composition 9 | Composition 10 |
|---|---|---|
| Resin Mixture | 96.65 | 96.65 |
| CHP | 1.89 | 1.89 |
| ATPB | 0.50 | 0.50 |
| APH | 0.96 | |
| Saccharin | | 0.96 |

Lap-shear tests where performed on magnesium substrates as described in the above examples following a 4-hour room temperature cure. The results are presented in Table 10.

TABLE 10

Lap-shear adhesive strength test results for adhesive compositions 9 and 10 (average 5 measurements)

| Adhesive | Stress at break (MPa) | Mode of Failure |
|---|---|---|
| Composition 9 | 4.2 | adhesive |
| Composition 10 | 0.3 | cohesive |

As seen in Table 10, the adhesive strength of Composition 9, containing APH, is 14 times that of the same composition containing a similar level of saccharin. The results confirm the superiority of APH over saccharin in promoting cure and adhesion of onium salts-containing anaerobic adhesives on magnesium substrates. The small reduction in adhesive strength of Composition 9 compared to Compositions 6 and 7 is likely due in part to the lower concentration of onium salts and in part to the shorter curing time of Composition 9 compared to Compositions 6 and 7.

EXAMPLE 8

A Determination of the Curing Rates of Anaerobic Adhesives on Magnesium Alloy Substrates A kinetic study on the room temperature (RT) curing of phosphonium salt-containing anaerobic adhesives was carried out by infrared spectroscopic analysis in attenuated total reflectance mode (ATR). In these experiments, a thin film of the liquid adhesive was sandwiched between a release treated zinc selenide (ZnSe) ATR crystal and a panel of AZ91D magnesium alloy, machined to the same dimensions of the crystal. The progress of anaerobic curing was then monitored in real-time by following the disappearances of absorbance bands associated with the reactive double bond of the (meth)acrylate groups at 1637 cm$^{-1}$. Curing is initiated as soon as the substrate is applied to the liquid adhesive film and air is excluded from the joint. The method permits an accurate measure of the rate and extent of curing in an adhesive bondline that is in direct contact with the metal substrate employed. The fractional conversion of monomer was determined from the normalized ratio of the (meth)acrylate group absorbance at 1637 cm$^{-1}$ to the carbonyl group absorbance at 1710 cm$^{-1}$ according to the expression $1-R_t/R_0$, where $R_0$ is the initial ratio (i.e. at time=0) and $R_t$ is the corresponding ratio at some time during or after the curing reaction (i.e. at time=t).

For the purposes of evaluating the effect of onium salts on the curing reactivity of anaerobic adhesives a test composition was prepared by blending together the components detailed in Table 11.

TABLE 11

Anaerobic adhesive test composition used in IR curing studies.

| Component | Weight % |
|---|---|
| urethane methacrylate (UM) resins | 76.14 |
| 2-hydroxypropyl methacrylate | 14.80 |
| acrylic acid | 6.20 |
| cumene hydroperoxide | 1.90 |

TABLE 11-continued

Anaerobic adhesive test composition used in IR curing studies.

| Component | Weight % |
|---|---|
| 2-acetylphenylhydrazine | 0.95 |
| stabilizers | 0.01 |

Figure 4:
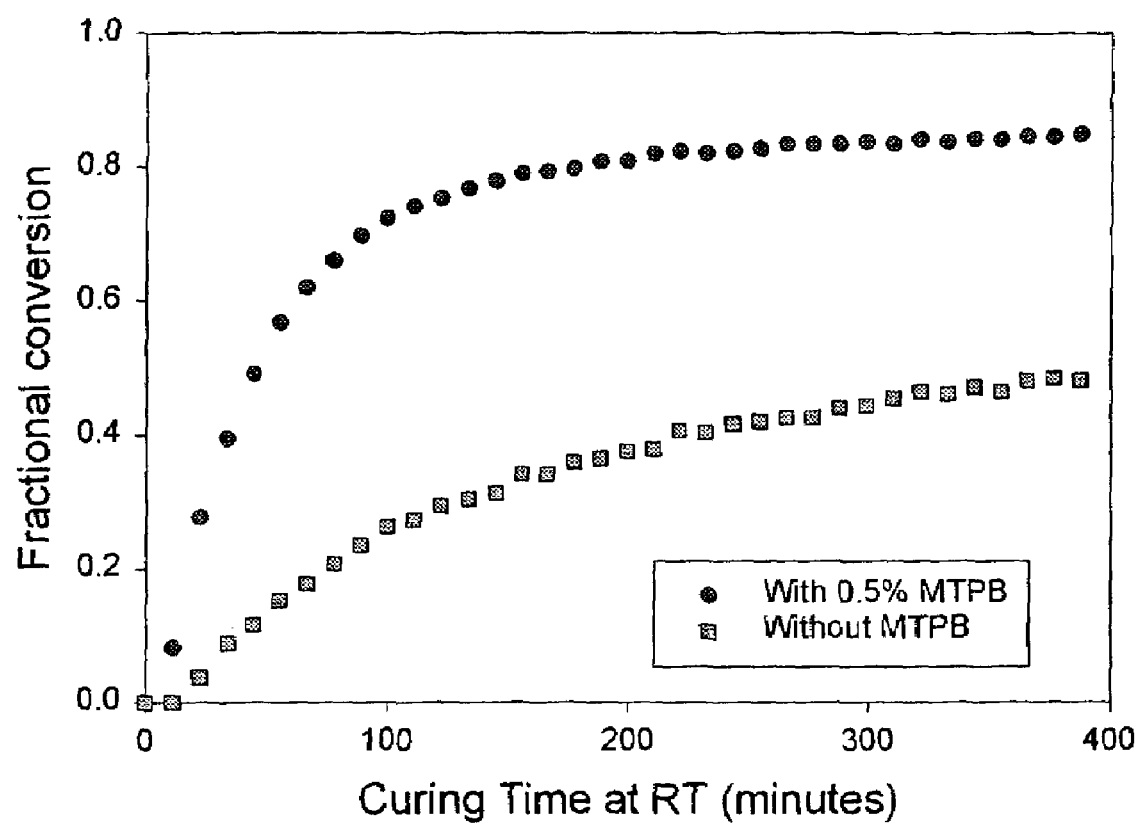
FIG. 4 is a graph showing an infrared spectroscopic plot of the fractional cure conversion as a function of cure time of anaerobic adhesives of the present invention as compared to the same composition without the onium salt.

The curing of this composition without onium salt was analyzed by the method described above, which showed that after about 400 minutes from the time of assembly, the extent of curing had only reached a value of about 40% as shown in FIG. 4. However, the addition of 0.5% of methyltriphenylphosphonium bromide to the test composition had a significant accelerating effect on the rate of curing and resulted in higher degree of curing (~80%) compared to the formulation without the onium salt catalyst (FIG. 4). After 3 hours, the curing of the composition with added MTPB is almost complete (~80% conversion), whereas the unmodified product has only reached ~35% conversion in the same time. It can also be seen from the conversion plots in FIG. 4 that, in the presence of MTPB, the initial curing rate is considerably more rapid compared to the composition without catalyst and that the small induction time or inhibition is not observed. After a conversion of about 70% of the (meth)acrylate groups the curing rate decreases sharply. This is most likely the result of gellation and vitrification. Curing was performed on ZN Se/AZ91D magnesium alloy bondline.

Figure 5:
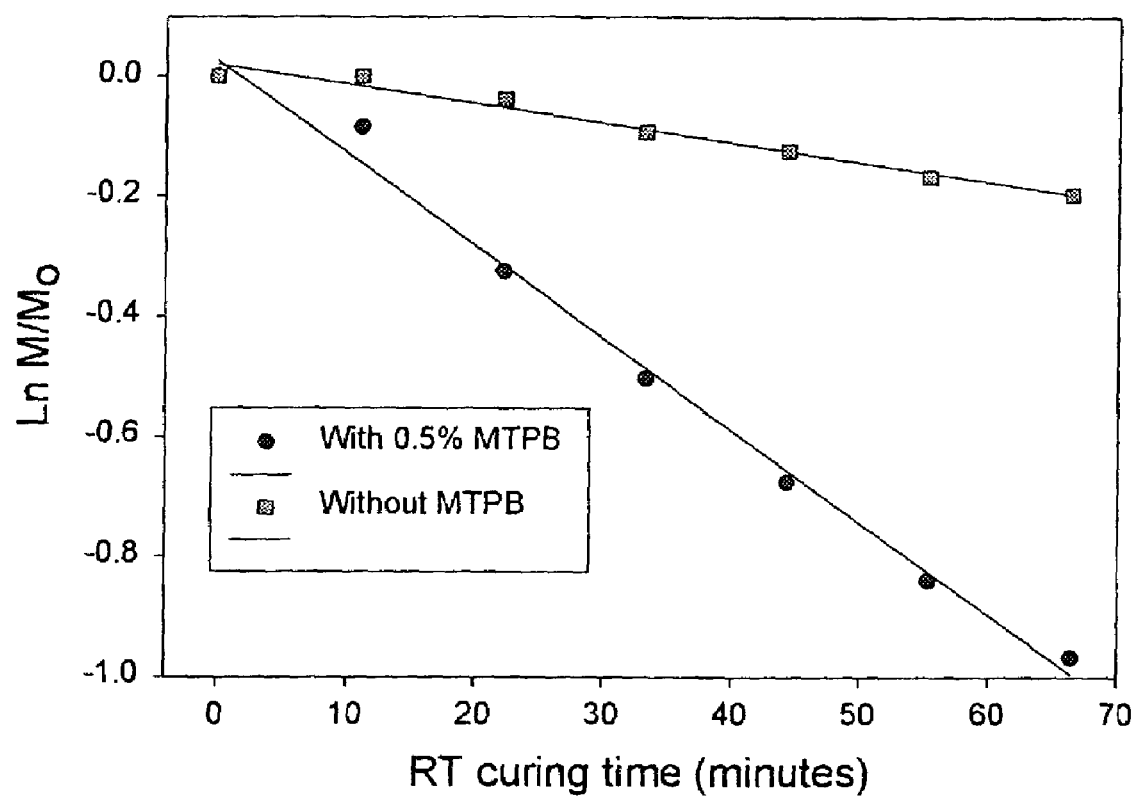
FIG. 5 is a graph showing the rate of cure on magnesium of the inventive composition as compared to the same composition without the onium salt.

Analysis of the above data shows that the initial curing period (0–65 minutes) can be conveniently described in terms of a first-order reaction where conversion rate is directly proportional to monomer concentration. Thus rate constants for monomer consumption during this period can be determined from the slopes of plots of $\ln[M]/[M_o]$ as a function of curing time. The ratio $[M]/[M_o]$ is the normalized concentration of methacrylate groups at any time during cure as determined by IR analysis. The results are shown in FIG. 5. FIG. 5 is a first-order plot for initial monomer conversion on magnesium alloy AZ91D during room temperature cure. The corresponding rate constants for the compositions with and without MTPB are $15.4(10^{-3})$ and $3.2(10^{-3})$/min. respectively. Thus, at a level of 0.5%, MTPB accelerates the initial curing speed of the test anaerobic adhesive on magnesium alloy by a factor of about 5 times.

The same technique was used to determine the optimum levels of APH and MTPB in the above formulation. At a constant concentration of APH the optimum level of MTPB was found to be between 0.1 and 0.5% by weight. In a related set of experiments the APH levels were varied between 0.25 and 2.0% at a constant concentration of 0.25% MTPB. These data show that APH levels in excess of 1.5% by weight have no additional affect on the cure speed.

EXAMPLE 9

Anaerobic Adhesive Composition Containing Tetrabutylammonium Bromide

A modified anaerobic adhesive composition was prepared by blending together 2.5 g of a 10% solution of tetrabutylammonium bromide (TBAB) in 2-hydroxypropyl methacrylate described and 97.5 g of the anaerobic adhesive formulation described in Table 11. This provided an adhesive composition containing 0.25% by weight of onium salt. Lap-shear adhesive testing was conducted on magnesium alloy substrates at 0.254 mm gap as described in Example 3. The specimens were cured at room temperature for 4 hours. For comparative purposes the adhesive without added salt was also evaluated. The results are presented in Table 12.

TABLE 12

Lap-shear test results of anaerobic adhesives with and without TBAB on Mg alloy specimens after curing at RT (0.254 mm gap; average of 5).

| Composition | Curing time (hours) | Average lap-shear strength (MPa) | Coefficient of variation (%) |
|---|---|---|---|
| With 0.25% TBAB | 4 | 6.0 | 13 |
| Without TBAB | 8 | 0.6 | 67 |

After curing for 4 hours at RT, the composition without added catalyst was so weakly bonded that the specimens broke before the test could be completed. The curing of this sample was, therefore, extended to 8 hours to enable the lap-shear strength to be measured. The large variance in the data as indicated by the coefficient of variation for the composition without TBAB further demonstrates that there is a lot of variation in the degree of curing from one specimen to the others. These results in conjunction with the results of Example 2, demonstrate that the addition of TBAB to anaerobic adhesives containing APH, activates the adhesive to curing on magnesium alloy substrates.

EXAMPLE 10

An Evaluation of the Catalyst Modified Anaerobic Adhesives on Various Passive Substrates An anaerobic adhesive was prepared by dissolving 0.25% by weight allyltriphenylphosphonium bromide (ATPB) into the test adhesive of Example 8. Lap-shear adhesive strength tests were performed on various substrates, which are known to be passivating towards the curing of anaerobic adhesives. The values were then compared to the unmodified adhesive (control sample) cured under the same conditions (cured at RT for 24 hours, 0.254 mm gap, average 5 specimens). In all cases, the ATPB-modified adhesive gave higher strengths compared to the unmodified material. The results are summarized in Table 13. The sensitivity of an adhesive to the various substrate surfaces is measured from the ratio of adhesive strength values of the compositions with and without added onium salt catalyst (A/C).

TABLE 13

Lap-shear adhesive test results ATPB modified and unmodified anaerobic adhesives on various passive substrates (RT 24 h; 0.254 mm; 5 specimens)

| Substrate | ATPB (A) (MPa) | Control (C) (MPa) | Surface Sensitivity (A/C) |
|---|---|---|---|
| Anodized aluminum | 11.2 | 7.1 | 1.6 |
| Zinc dichromate steel | 6.0 | 1.8 | 3.3 |
| Stainless steel | 8.0 | 5.0 | 1.6 |
| Magnesium | 7.0 | 1.4 | 5.0 |

Although the activity of the anaerobic adhesive modified with the onium salt is enhanced on all the substrates examined, the proportional increase in strength (A/C ratio) is greatest for magnesium, indicating a high surface sensitivity towards this substrate. By comparison, the surface sensitivities (A/C) to anodized aluminum and stainless steel are relatively low. With zinc dichromate the value was intermediate, suggesting that onium salt containing compositions may also be useful for the bonding of these substrates.

In the inventive compositions containing ATPB, the percentage increase in adhesive strength on magnesium is 400% greater than the control; on stainless steel is a 60% increase over the control; zinc dichromate steel is 233% increase over the control; and on amodized aluminum is 58% greater than the control.

EXAMPLE 11

Anaerobic Sealant Compositions

The usefulness of onium salts for promoting the curing of anaerobic sealant compositions on magnesium substrates was also demonstrated. A composition having good sealing properties was prepared by blending together the components shown in Table 14.

TABLE 14

Anaerobic Sealant Composition

| Component | Weight % |
|---|---|
| polyether-urethane methacrylate (PUM) resins | 82.00 |
| 2-hydroxypropyl methacrylate | 2.50 |
| acrylic acid | 4.00 |
| silica | 8.50 |
| cumene hydroperoxide | 2.00 |
| 2-acetylphenylhydrazine | 0.99 |
| stabilizers | 0.01 |

A similar composition containing additionally 0.25% allyltriphenylphosphonium bromide (ATPB) was also prepared. The lap-shear adhesive strength development of the two compositions was then compared on AZ91D magnesium alloy specimens (as described in Example 3). The results are presented in Table 15.

TABLE 15

Adhesive test results of anaerobic sealant composition on AZ91D magnesium alloy (cured 24 h at RT; 0.254 mm gap; 5 specimens)

| Formulation | Average lap-shear strength (MPa) | Coefficient of variation (%) |
|---|---|---|
| With 0.25% ATPB | 2.9 | 24 |
| Without catalyst | 0.9 | 11 |

The results indicate that there is an approximate 3-fold increase in adhesive strength for the sealant composition containing ATPB compared to the same sealant composition without the catalyst. The catalyst thus promotes the curing and adhesive strength development of the anaerobic sealant composition on magnesium substrates.

The examples set forth above serve to illustrate the present invention, but in no way are intended to limit the spirit and scope thereof, which is defined by the following claims.

What is claimed is:

1. An adhesive composition capable of bonding passive substrates, comprising:
   (a) at least one monomer;
   (b) at least one peroxy free radical initiator;
   (c) at least one onium salt; and
   (d) at least one organic hydrazine present in an amount less than 1.0% by weight of said composition, wherein said monomer is selected from the group consisting of styrene, thiol-enes, acrylamides, maleate esters, fumarates, methylene maleates, and epoxides.

2. The composition of claim 1, wherein said monomer is anaerobically curable.

3. The composition of claim 1, wherein said monomer is curable by a moisture cure mechanism, heat cure mechanism, photo initiator mechanism and combinations thereof.

4. The composition of claim 1, further comprising a (meth)acrylate monomer.

5. The composition of claim 4, wherein said (meth) acrylate monomer is selected from the group consisting of diethylene glycol dimethacrylate, triethylene glycol dimethacrylate, tetraethylene glycol dimethacrylate, polyethylene glycol dimethacrylate, diethylene glycol diacrylate, triethylene glycol diacrylate, tetraethylene glycol diacrylate, polyethylene glycol diacrylate, di(pentamethylene glycol) dimethacrylate, tetraethylene glycol di(chloroacrylate), diglycerol diacrylate, diglycerol tetramethacrylate, butylene glycol dimethacrylate, neopentyl glycol diacrylate, trimethylolpropane triacrylate, hydroxypropyl methacrylate and combinations thereof.

6. The composition of claim 4, wherein said (meth) acrylate monomer is selected from the group consisting of ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth) acrylate, glyceryl propoxylate tri(meth)acrylate, trimethylolpropane tri(meth)acrylate, dipentaerythritol monohydroxy penta(meth)acrylate, tri(propylene glycol)di(meth) acrylate, neopentylglycol propoxylate di(meth)acrylate, 1,4-butanediol di(meth)acrylate, polyethyleneglycol di(meth) acrylate, triethyleneglycol di(meth)acrylate, butylene glycol di(meth)acrylate, ethoxylated bisphenol A di(meth)acrylate and combinations thereof.

7. The composition of claim 4, wherein said (meth) acrylate monomer is a polyurethane (meth)acrylate monomer.

8. The composition of claim 7, wherein said polyurethane (meth)acrylate monomer has the structure:

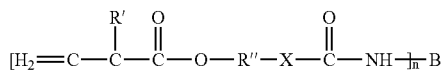

wherein B is a polyvalent organic radical selected from the group consisting of alkyl, alkenyl, cycloalkyl, aryl, aralkyl, alkaryl and heterocyclic radicals both substituted and unsubstituted; X is selected from the group consisting of —O— and

radicals; n is an integer from 2 to 6 inclusive; R' is selected from the class consisting of hydrogen, chlorine and methyl and ethyl radicals; and R" is a divalent organic radical selected from the group consisting of lower alkylene of 1 to 8 carbon atoms, phenylene and naphthalene radicals.

9. The composition of claim 1, wherein said peroxy free radical initiator is cumene hydroperoxide.

10. The composition of claim 1, wherein said peroxy free radical initiator is selected from the group consisting of methylethyl ketone hydroperoxide, t-butyl hydroperoxide, p-menthane hydroperoxide, diisopropylbenzene hydroperoxide, pinene hydroperoxide, and combinations thereof.

11. The composition of claim 1, wherein said onium salt is selected from the group of the group consisting of phosphonium salts, ammonium salts, and combinations thereof.

12. The composition of claim 11, wherein said phosphonium salt is represented by the structure:

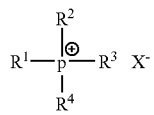

wherein $R^1$, $R^2$, $R^3$ and $R^4$, which may be the same or different, are optionally substituted hydrocarbyl, hydrocarbylaryl, aryl; and X is Cl, Br or F or a soft anion.

13. The composition of claim 11, wherein said phosphonium salt is selected from the group consisting of 2-(ethoxycarbonyl) ethyl triphenylphosphonium bromide, 1-ethoxycarbonyl ethyl triphenylphosphonium bromide, 4-ethyoxycarbonylbutyl triphenylphosphonium bromide, carbethoxymethyl triphenylphosphonium bromide, and combinations thereof.

14. The composition of claim 11, wherein said phosphonium salt is allyltriphenylphosphonium bromide.

15. The composition of claim 1, wherein said onium salt is present in an amount from about 0.25 to about 2.0% by weight of said composition.

16. The composition of claim 1, wherein said organic hydrazine is selected from the group consisting of 1-acetyl-2-phenyl hydrazine, 1-acetyl-2(p-tolyl)hydrazine, 1-benzoyl-2-phenyl hydrazine, 1-(1',1',1'-trifluoro)acetyl-2-phenyl hydrazine, 1,5-diphenylcarbohydrazide, 1-formyl-2-phenyl hydrazine, 1-acetyl-2-(p-bromophenyl)hydrazine, 1-acetyl-2-(p-nitrophenyl)hydrazine, 1-acetyl-2-(p-methoxyphenyl)hydrazine, 1-acetyl-2-(2'-phenylethyl)hydrazine, 1-acetyl-2-methyl hydrazine, 1-phenylsemicarbazide, 2-phenyl-t-butylcarbazate, succinic acid di(phenylhydrazide), and combinations thereof.

17. The composition of claim 1, further comprising ingredients selected from the group consisting of saccharin, dimethyl p-toluidine, phenolic stabilizers, chelating agents, and combinations thereof.

18. A one-part anaerobic adhesive composition having improved adhesion to passive substrates, comprising:
(a) at least one acrylate monomer;
(b) at least one peroxy free radical initiator;
(c) at least one phosphonium salt represented by the structure:

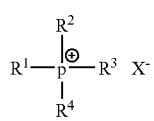

wherein $R^1$, $R^2$, $R^3$ and $R^4$, which may be the same or different are optionally substituted hydrocarbyl, hydrocarbylaryl, or aryl; and X is Cl, Br or F or a soft anion; and (d) acetylphenyl hydrazine in an amount from 0.25% to less than 1.0% by weight of said composition.

19. A method for providing enhanced adhesion to passive substrates, comprising the steps of:
a) providing a composition comprising
(i) at least one monomer selected from the group consisting of styrene, thiol-enes, acrylamides, maleate esters, fumarates, methylene maleates, and epoxides;
(ii) at least one peroxy free radical initiator;
(iii) at least one onium salt; and
(iv) at least one organic hydrazine present in an amount less than 1.0% by weight of said composition;
b) disposing said composition between two substrates; and
c) effecting cure of said composition to effectuate enhanced adhesion thereof.

20. A method of making an anaerobic adhesive composition having improved adhesion to passive substrates, comprising the steps of:
a) providing at least one monomer selected from the group consisting of styrene, thiol-enes, acrylamides, maleate esters, fumarates, methylene maleates, and epoxides, at least one peroxy free radical initiator, at least one onium salt; and at least one organic hydrazine present in an amount less than 1.0% by weight of said composition; and
b) combining each of said components to form a mixture.

21. A one-part adhesive composition capable of bonding passive substrates, comprising:
(a) at least one monomer;
(b) at least one peroxy free radical initiator;
(c) at least one onium salt; and
(d) at least one organic hydrazine in an amount from 0.25% to less than 1.0 % by weight of said composition, wherein said onium salt is selected from the group consisting of phosphonium salts represented by the structure:

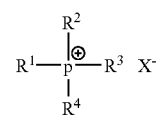

wherein $R^1$, $R^2$, $R^3$ and $R^4$, which may be the same or different are optionally substituted hydrocarbyl, hydrocarbylaryl, or aryl; and X is Cl, Br or F or a soft anion, ammomum salts.

22. The composition of claim 21, wherein said monomer is selected from the group consisting of styrene, thiol-enes, acrylamides, maleate esters, fumarates, methylene maleates, and epoxides.

23. The composition of claim 1, wherein the passive substrate is magnesium.

24. The composition of claim 18, wherein the passive substrate is magnesium.

25. The composition of claim 2, wherein the passive substrate is magnesium.

26. The composition of claim 21, wherein the passive substrate is magnesium.

27. A method for providing enhanced adhesion to passive substrates, comprising the steps of:
a) providing a one-part composition comprising
(i) at least one monomer;
(ii) at least one peroxy free radical initiator;

(iii) at least one onium salt selected from the group consisting of phosphonium salts represented by the structure:

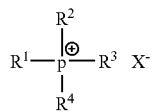

wherein $R^1$, $R^2$, $R^3$ and $R^4$, which may be the same or different are optionally substituted hydrocarbyl, hydrocarbylaryl, or aryl; and X is Cl, Br or F or a soft anion; and (iv) at least one organic hydrazine in an amount from 0.25% to less than 1.0% by weight of said composition;

b) disposing said composition between two substrates; and c) effecting cure of said composition to effectuate enhanced adhesion thereof.

28. The method of claim 19, wherein the passive substrate is magnesium.

29. The method of claim 27, wherein the passive substrate is magnesium.

30. A method of making a one-part anaerobic adhesive composition having improved adhesion to passive substrates, comprising the steps of:

a) providing at least one monomer, at least one peroxy free radical initiator, at least one onium salt selected from the group consisting of phosphomum salts represented by the structure:

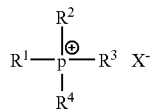

wherein $R^1$, $R^2$, $R^3$ and $R^4$, which may be the same or different are optionally substituted hydrocarbyl, hydrocarbylaryl, or aryl; and X is Cl, Br or F or a soft anion; and at least one organic hydrazine in an amount from 0.25% to less than 1.0% by weight of said composition; and b) combining each of said components to form a mixture.

31. The method of claim 30, wherein the passive substrate is magnesium.

32. The method of claim 19, further comprising an acrylate monomer in step a).

33. The method of claim 20, further comprising an acrylate monomer in step a).

34. The composition of claim 12, wherein the soft anion is a member selected from the group consisting of $SbF_6$, $BF_4$ and $PF_6$.

35. The composition of claim 18, wherein the soft anion is a member selected from the group consisting of $SbF_6$, $BF_4$ and $PF_6$.

36. The composition of claim 21, wherein the soft anion is a member selected from the group consisting of $SbF_6$, $BF_4$ and $PF_6$.

37. The method of claim 27, wherein the soft anion is a member selected from the group consisting of $SbF_6$, $BF_4$ and $PF_6$.

38. The method of claim 28, wherein the soft anion is a member selected from the group consisting of $SbF_6$, $BF_4$ and $PF_6$.

39. A one-part adhesive composition comprising:

(a) at least one monomer;

(b) at least one peroxy free radical initiator;

(c) at least one onium salt; and (d) at least one organic hydrazine, wherein the composition cures faster in the presence of the onium salt as compared to the same composition without added onium salt.

* * * * *